United States Patent
Belanger et al.

[11] Patent Number: 6,021,556
[45] Date of Patent: *Feb. 8, 2000

[54] CURTAIN-STYLE VEHICLE LAUNDRY DEVICE

[75] Inventors: Michael J. Belanger, Novi; Robert J. Wentworth, Farmington Hills, both of Mich.

[73] Assignee: Belanger, Inc., Northville, Mich.

[*] Notice: This patent is subject to a terminal disclaimer.

[21] Appl. No.: 09/107,611

[22] Filed: Jun. 30, 1998

Related U.S. Application Data

[63] Continuation of application No. 08/641,115, Apr. 29, 1996, Pat. No. 5,813,076.

[51] Int. Cl.[7] .................................................. B23P 11/02
[52] U.S. Cl. ............................ 29/450; 15/97.3; 15/53.1; 15/DIG. 2
[58] Field of Search ................................. 15/97.3, 53.1, 15/53.2, 179, DIG. 2; 29/450

[56] References Cited

U.S. PATENT DOCUMENTS

| | | | |
|---|---|---|---|
| 4,439,883 | 4/1984 | Hanna | 15/97.3 |
| 4,967,440 | 11/1990 | Belanger | 15/230.14 |
| 5,584,090 | 12/1996 | Ennis | 15/97.3 |

*Primary Examiner*—S. Thomas Hughes
*Assistant Examiner*—Steven Blount
*Attorney, Agent, or Firm*—Young & Basile, P.C.

[57] ABSTRACT

A laundering implement is provided for cleaning an external surface of a vehicle. A plurality of spacers are supportable with respect to a path of travel for a vehicle to be cleaned and are arranged in first and second stacked or sandwiched groups of spacers for oscillating or rotating movement about a common axis of rotation or axial shifting oscillation along a common axis. Each spacer in a group moves in unison with adjacent stacked spacers of the same group. Each spacer has opposite complimentary faces matable with an opposing face of an adjacent spacer. A plurality of cloth elements are interposed between adjacent stacked spacers for movement in concert therewith. At least a portion of a cloth cleaning element is interposed between adjacent spacers. The interposed portion of the element is anchored on an anchoring pin extending between the adjacent spacers, and the cleaning element and adjacent spacers are compressively sandwiched toward one another.

2 Claims, 5 Drawing Sheets

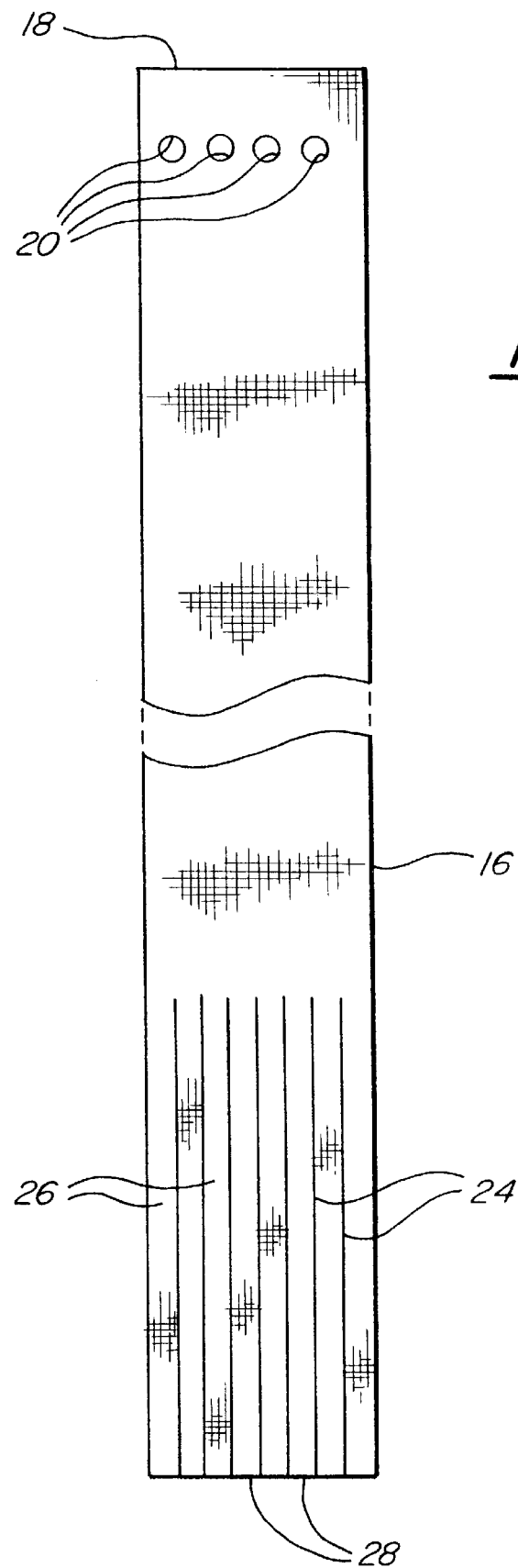

CURTAIN-STYLE VEHICLE LAUNDRY DEVICE

RELATED PATENT APPLICATIONS

This application is a continuation of Ser. No. 08/641,115 filed Apr. 29, 1996, now U.S. Pat. No. 5,813,076.

This application is related to a U.S. patent application Ser. No. 08/641,024 filed Apr. 29, 1996, now U.S. Pat. No. 5,813,076 for "VEHICLE LAUNDRY IMPLEMENT AND REPLACEABLE CLOTH ELEMENT FOR USE THEREWITH".

FIELD OF THE INVENTION

The present invention relates to a laundering implement of the type having multiple cloth elements which contact an external surface of a vehicle or other structure to be treated and in particular, facilitates reconstruction of the laundering implement by removing and replacing the individual cleaning elements anchored on the laundering implement.

BACKGROUND OF THE INVENTION

Vehicle laundry systems have evolved from designs having rotatable top and side brushes with long polypropylene strands toward the use of brushes and curtains with cloth elements made of rectangular, non-woven, synthetic felt. The mounting end of the element is formed by folding the material of the element back over a plastic insert and thereafter stitching the folded material to form an edge bead which is inserted into a slot formed in a carrier or hub. Examples of this type of vehicle laundry system as applied to brushes can be seen in U.S. Pat. No. 4,055,028 and U.S. Pat. No. 4,018,014.

In a curtain-type implement, extruded metal slats are suspended for oscillatory motion over a vehicle lane. The bottoms of the slats are provided with longitudinal keyways which receive the edge bead of the cloth elements. The rack or an arrangement of several racks is typically constructed to be supported above a vehicle laundering station by means of a four-legged structure constructed of square or rectangular beams. A drive system is typically mounted on a platform in the center of the structure and is connected to the racks by suitable linkages.

Such prior art curtain laundry systems have several drawbacks, each of which is addressed by our invention as set forth herein. First, the overall appearance of the prior art curtain laundry station is "mechanically busy"; i.e., there is a strong sense of the profusion of beams and slats which is at odds with efforts to make vehicle laundries or "car washes" more aesthetically pleasing to the customer, both inside and outside the building.

Second, the cost of constructing such a system is high as a result of the quantity of material needed and the labor required to build or assemble the system on site.

Third, the support structure takes up a lot of valuable space and this opposes the increasing demand to include more laundry features and stations in a given conveyor corridor length.

Fourth, where left and right banks of curtain elements are employed in a single support structure, a substantial gap exists between them and this gap may lead to inadequate cleaning of the vehicle along the longitudinal centerline thereof.

SUMMARY OF THE INVENTION

According to one aspect of the invention, an improved highly simplified structure is provided for an oscillating curtain type laundering system which eliminates the "busy" look and expensive structure of the prior art. In general, this is achieved by providing a simple arch structure having, in some cases, as few as two vertical supports and a single cross beam which provides support for the curtain carriers as well as the drive system components in a compact, minimally cantilevered fashion. In the preferred embodiment, the cross beam also defines the swing axis of the curtain carriers; i.e., the carriers can be mounted to rotate about the cross beam centerline on bearings mounted directly to the cross beam.

According to another aspect of the invention, a laundering implement for cleaning or treating an external surface of a vehicle or other article includes replaceable cloth element having an elongate fabric body engageable with the treated surface, and mounting means defined by at least one aperture formed through the body near one end thereof for receiving an anchoring pin. Means are provided for anchoring multiple elements in spaced parallel relationship and depending into contacting relation with a vehicle. In a preferred form, the element carrier means comprises stacked spacers arranged such that the elements are captured between the mating surfaces, the spacers can be clamped together for operation, and unclamped to sufficiently separate adjacent spacers for easy removal and replacement.

In the preferred form, the cloth elements of the present invention do not require inserts and, therefore, do not require tedious or difficult insertion into slots. The elements are, therefore, easily removed and replaced. The elements are also less expensive to manufacture. In some cases, all stitching can be eliminated from the cloth elements.

As hereinafter described and illustrated in detail with reference to a laundering implement in the form of a curtain, the curtain is made up of multiple depending cloth elements arranged in a generally vertically extending planar form or an approximation thereof. The cloth elements may be slitted to form vertically extending fingers which contact the surface to be processed. The cloth elements are elongate rectangles, or approximations thereof, and are mounted on and between stacked spacers. The stacked spacers are compressibly clamped to capture and anchor sandwiched cloth elements interposed between adjacent spacers.

The terms "laundering" and "cleaning", as used herein, refer primarily to the operation of wet washing a vehicle, but may also be construed to include wet and dry polishing functions, as well as other processing or treating functions performed by engagement with an external surface of an article, not necessarily a vehicle.

According to another aspect of the invention, individual vehicle laundry brush and/or curtain elements are provided which require no edge bead inserts. The elements are constructed and arranged so as to minimize the time and difficulty involved in attaching the elements to a carrier.

The cloth elements according to the present invention are constructed of a non-woven fabric body, and include mounting means defined by at least one aperture formed through each body for receiving an anchoring pin supported by a carrier or spacer.

The laundry implement of the present invention is light in weight, accommodates cloth elements in a stacked or sandwiched array, and facilitates rebuilding or reconstruction of the laundering implement to replace the cloth elements. The laundering implement can include a plurality of carrier or spacer bodies arranged in parallel, stacked or sandwiched relation and having in each case at least one face which lies adjacent to, but not necessarily in contact with a mating face of an adjacent spacer. The spacers can be formed as hollow, lightweight bodies, preferably constructed of plastic. At least one of the end-most spacers may be secured to a drive element, such that a rotary or oscillatory drive force may be imparted to the spacers and to the cloth elements anchored or captured therebetween. The cloth elements disposed between the mating faces of adjacent spacers are preferably held in place by anchor pins which extend between the faces of these spacers. The word "pin", as used herein, denotes a linking element generally and need not be dowel-like or cylindrical in shape. The pins are preferably constructed of plastic.

The spacers used to construct an oscillating curtain-type laundering implement are generally rectangular in shape and horizontally stacked to define a basic outline of the curtain. The adjacent mating faces of the spacers can be non-planar; i.e., constructed with an angular offset to fill any gap formed between alternately oscillated racks of spacers.

The spacers may be constructed of hollow lightweight material, such as blow molded plastic. The spacers may be selectively applied and removed from supported, oscillating relationship with a cross beam by radial movement with respect to the supporting beam member, rather than only through endwise or axial de-stacking. A laundering implement having spacers constructed according to the present invention can be easily rebuilt by loosening compression means acting on adjacent spacers to permit sufficient spreading apart of the spacers to readily remove the individual cloth elements compressively interposed and sandwiched therebetween. The cloth elements are readily removed from the corresponding anchor pins supported by the adjacent spacers and replaced with new elements. After all elements have been quickly and easily replaced, the laundering implement is reconstructed into an integral unit by axial clamping and can then be restored to the operative association with other vehicle laundry components.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 7 is a plan view of a typical cloth curtain element.

DESCRIPTION OF THE PREFERRED EMBODIMENT

Figure 1:
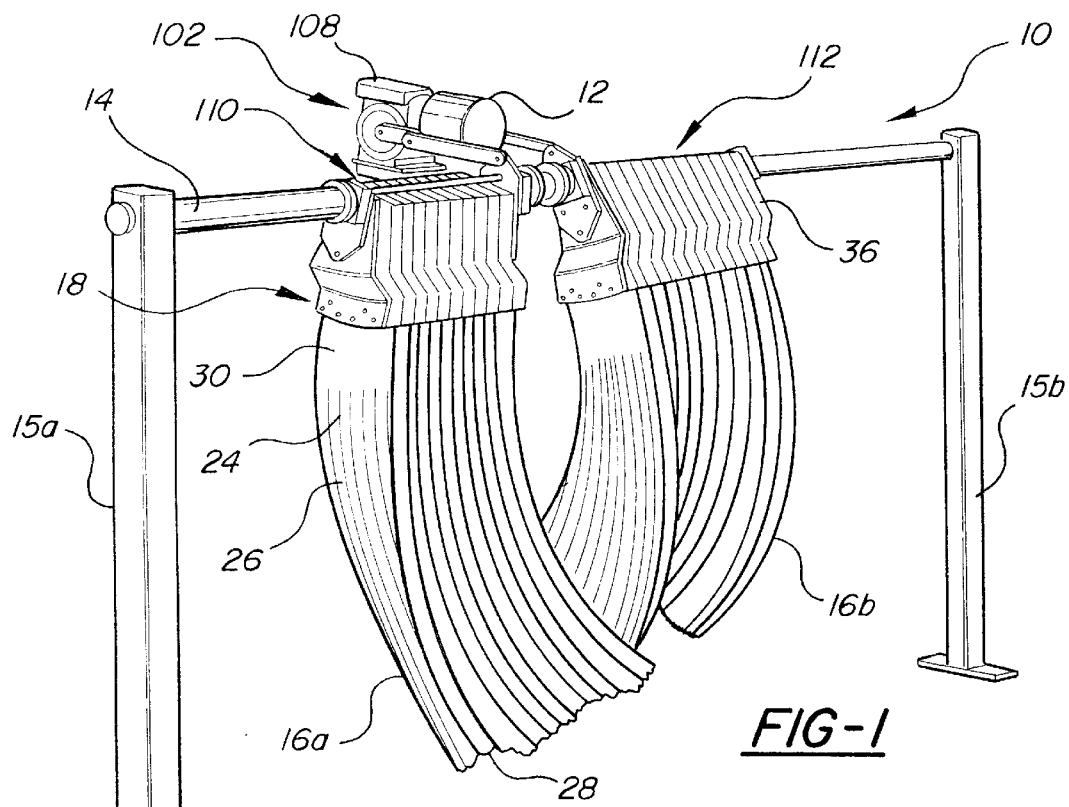
FIG. 1 is a perspective view of a vehicle laundering implement including a curtain constructed and used according to the present invention.

FIG. 1 illustrates a laundering implement 10 of the oscillating curtain type comprising left and right banks 16a and 16b of depending cloth elements which are oscillated fore and aft in out-of-phase relationship by a motor 12. Both banks 16a and 16b of curtain elements and motor 12 are mounted on a six inch diameter aluminum tubular cross beam 14 which is disposed above a vehicle lane by space apart, vertical supports 15a and 15b. The vertical supports 15a, 15b have foot plates which can be anchored by conventional means to a foundation or floor. Implement 10 can be installed as part of a processing system for cleaning or treating an external surface of an article, such as a vehicle passing through the laundry system. Although shown with the direction of oscillatory motion parallel to vehicle travel, it is to be understood that the direction of oscillatory motion may also be laterally of the vehicle. This can, for example, be achieved by supporting beam 14 so that it runs lengthwise of the treated vehicle rather than across it as shown.

FIG. 7 illustrates in plan view a cloth curtain element 16 from either of the banks 16a and 16b. Element 16 is cut from a sheet of synthetic felt of a type available from Ozite, National Felt and several other manufacturers identified in our copending application Ser. No. 08/641,024 identified above. Element 16 is rectangular and has four circular apertures 20 due cut therein near the top end 18 for installation purposes to be described.

Toward the free end 28, the element 16 is longitudinally slitted by parallel cuts 24 into fingers 26 which enhance cleaning action.

The elements are typically from about six to eight feet in length, from about 4 to 12 inches in width and are made from ⅛" to ¼" material. Because of the unique way in which they are mounted, they require no folding or stitching to manufacture. It is, however, well within the scope of our invention to reinforce the top and of the elements 16 with stitched or bonded components as the designer sees fit or even to make the top portion of the element 16; i.e., the portion with the apertures 20, as a separate piece which is suitably attached to a felt body.

Referring now to FIGS. 1 through 4, the manner and means by which the banks 16a and 16b of suspended curtains are assembled well be described in detail. Bank 16a is the mirror image of bank 16b in virtually all respects; therefore, only one bank will be fully described.

Bank 16a comprises a horizontal stack 110 of nearly identical, hollow, plastic spacers 36 integrated with one another to form a disassemblable unit by means of complementary, nesting pins 22 and sockets 46 arranged in top and bottom rows as well as tie rods 62, 54 and 84 and end plates 56. Cloth elements 16 are interposed between the spacers 36 in parallel and at approximately 2" spacing and are held in place by virtue of the fact that the bottom row pins 22 extend through the apertures 20.

Figure 4:
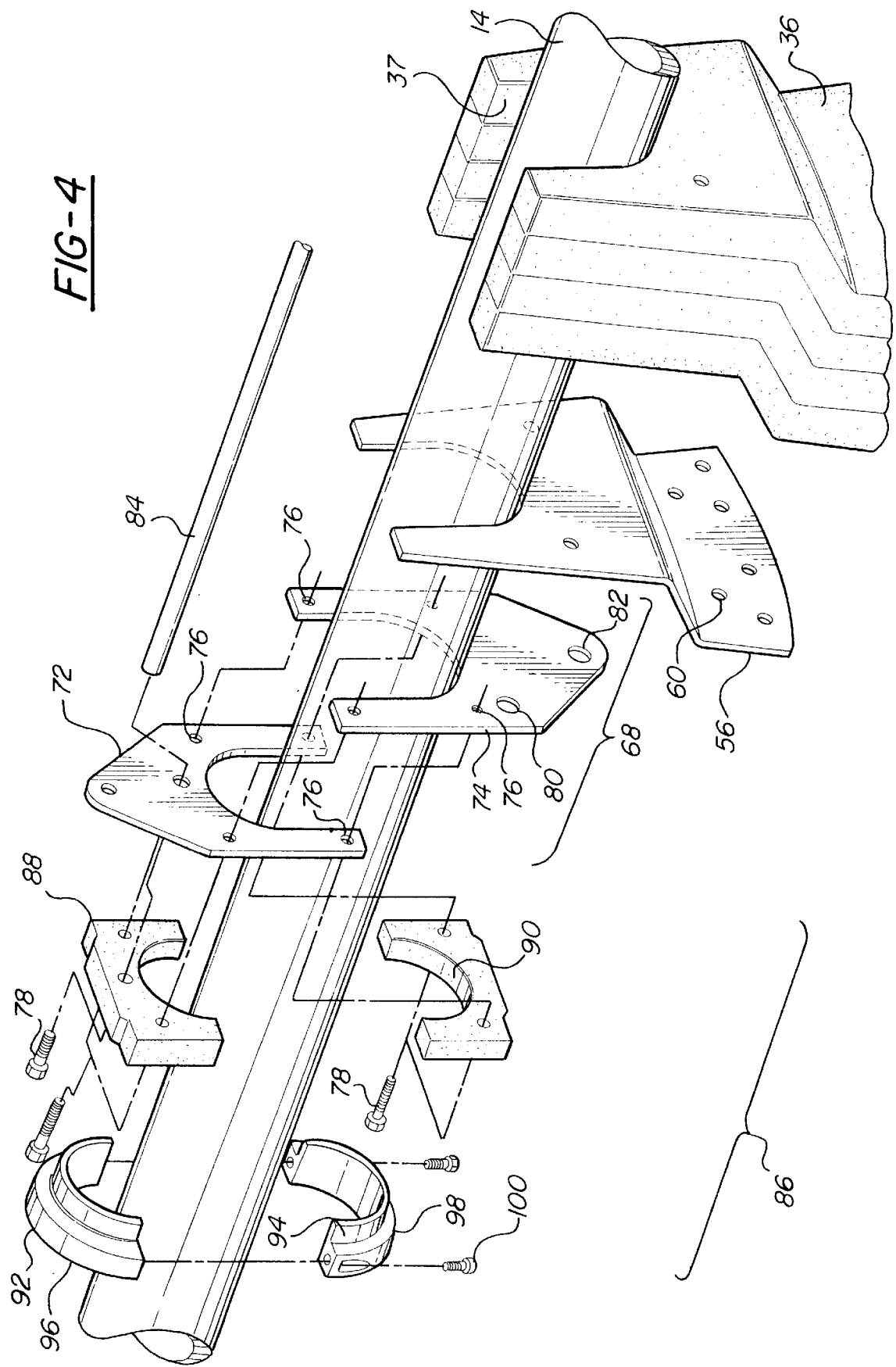
FIG. 4 is an exploded perspective view of the rotatable bearing assembly and end of the curtain-type laundering implement of FIG. 3.
Figure 5:
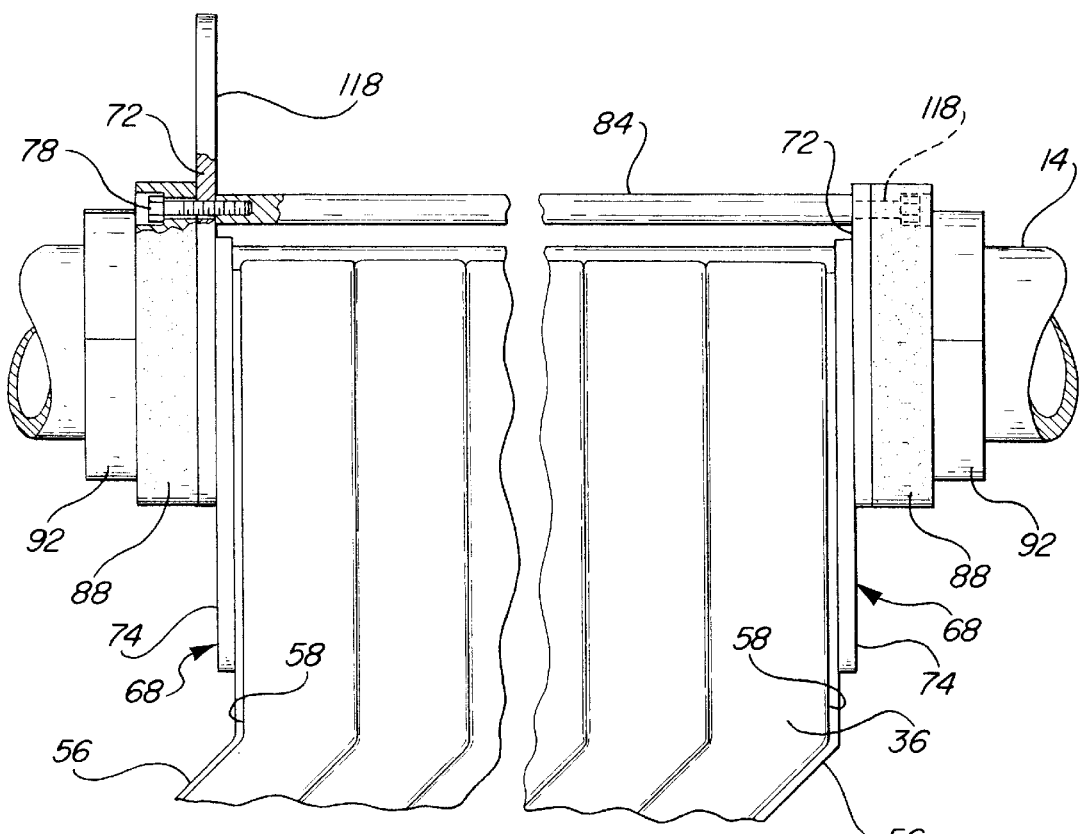
FIG. 5 is an elevational view of a horizontally stacked or sandwiched spacer grouping mounted for rotation about a frame member according to the present invention.
Figure 6:
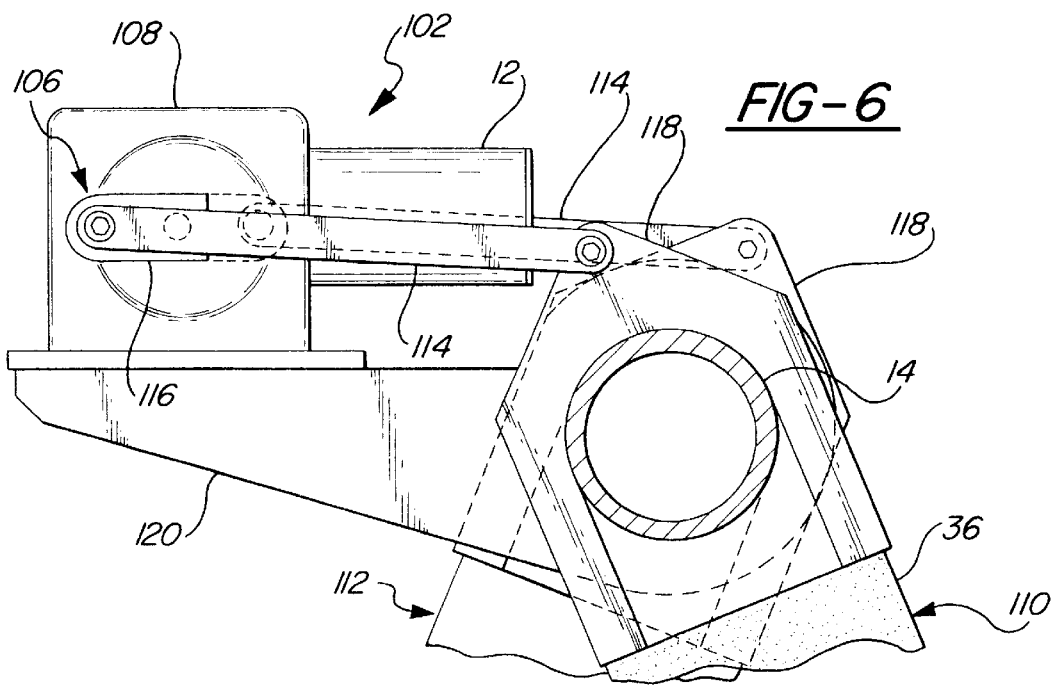
FIG. 6 is a side elevational view of an oscillating motor for driving the curtain assembled according to the present invention in unsynchronized motion with respect to the frame member.

Spacers 36 have open-ended channels 37 formed at the top ends to receive in spaced, non-contacting relation therein the cross beam 14 as best shown in FIG. 4. Once integrated as a unit, the spacers 36 and element 16 are rotatably supported on beam 14 by means of end bearings made up of two-part metal inner bearing elements 92,94 and two part plastic outer bearing elements 88,90, the former being mechanically secured to beam 14 and the latter being secured to the bank 16a or 16b. An assembled unit is shown in FIG. 5.

Figure 2:
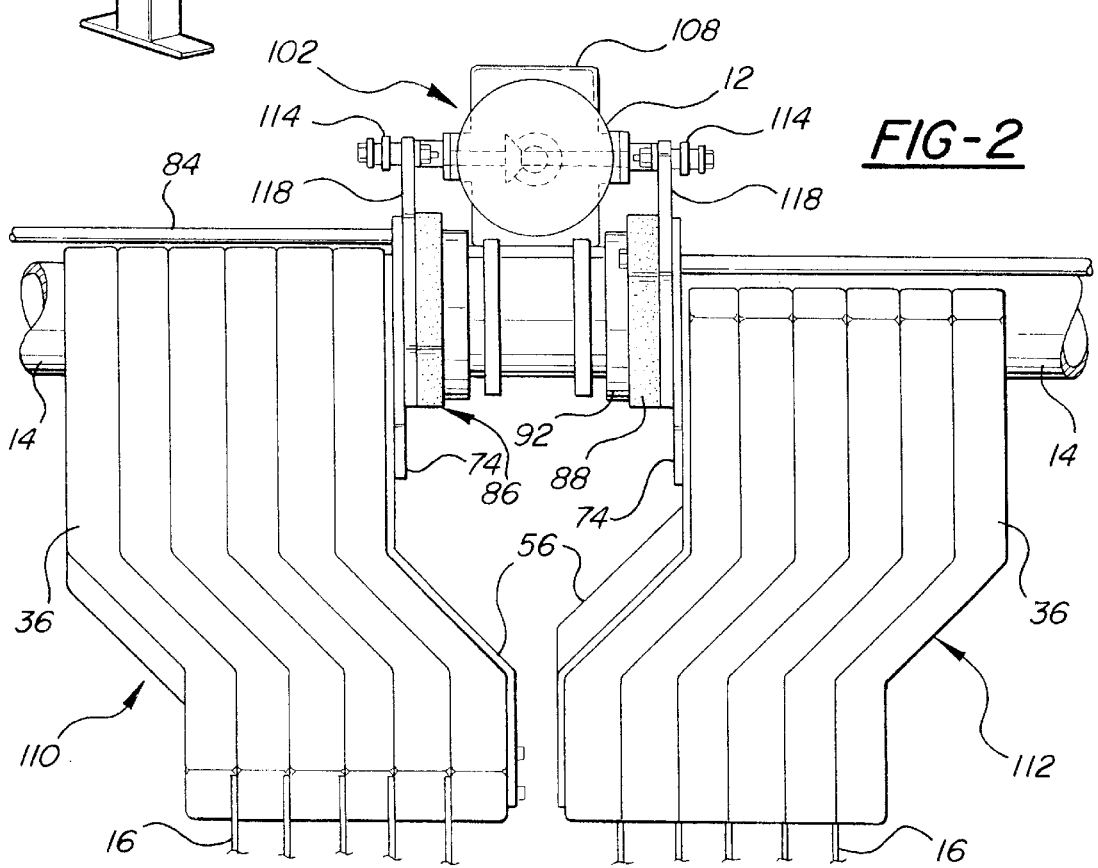
FIG. 2 is a detailed elevational view of a portion of the curtain assembly of FIG. 1.

Finally, the banks 16a and 16b are oscillated fore and aft by a motor and crank system 102 which is mounted on arms 120 welded to beam 14 near the center, the overall arrangement being such that the mass center of the entire structure is at or very near the geometric center of beam 14. As shown in FIG. 2, the center bearings for the two banks are relatively near one another, reducing the gap between the banks. Still further reduction is achieved by molding spacers 36 in an offset design such that the lower ends of the two centermost spacers in the final assembly are minimally separated.

Describing the apparatus in greater detail, a plurality of stackable blow-molded plastic carriers or spacers 36 are arranged in mirror-image fashion to form the banks 16a and 16b. Elements 16 are interposed between adjacent spacers in each bank. Anchor means 38 is supported by the spacers 36 and operably engages with or passes through the four apertures 20 formed in the top portion of each element 16 for anchoring each element 16 with respect to the adjacent stacked spacers 36. The spacers 36 can be formed substantially identical in shape and contour to one another. The anchoring means 38 can include each spacer 36 having a first face 42 with at least one anchoring pin 22 extending outwardly from the first face 42. In addition, the anchoring means 38 can include each spacer 36 having a second face 44 with at least one complementary aperture 46 formed therein for receiving the anchoring pin 22 extending outwardly from the first face 42 of an adjacent spacer 36. In the alternative, each spacer 36 can have at least one aperture 46 formed therein for receiving a complementary shaped anchor means 38 extending therethrough, such as an anchoring pin 22.

Additional mating protrusions 48 and recesses or apertures 50 may be formed in opposing first and second faces. 42 and 44, of adjacent spacers or carriers 36 in order to interlock the stacked or sandwiched spacers 36 with respect to one another with sufficient rigidity to perform the desired oscillating or rotating movement. The combination of the complementary protrusions 48 and apertures 50 defining means 52 for interconnecting adjacent spacers 36. Preferably, means 54 is provided for urging the spacers 36 toward one another into a cohesive single unitary assembly for oscillatory motion. The urging means 54 includes a stiffening plate 56 of a complementary shape and contour to engage an outer end face 58 of the end-most spacer 36. The outer end face 58 includes at least one aperture 60 extending therethrough in coaxial alignment with corresponding apertures formed in the first and second faces, 42 and 44 respectively, of the stacked spacers 36 for receiving a compression member 62 extending entirely through the longitudinal length of the stacked spacers 36. Preferably, the elongated compression member 62 includes at least one end having a threaded portion 64 for receiving a nut 66 threadably engaged thereon. Tightening the nut 66 along the threaded portion 64 of the elongated compression member 62 results in the outer stiffening plates 56 on opposite ends of the stacked spacers 36 to be compressibly clamped toward one another sandwiching the spacers 36 and interposed portions of the elements 16 between the two outer stiffening plates 56. If required for the particular application, additional compression members can be used to provide the desired rigidity. The stiffening plate 56 preferably extends over a substantial portion of the outer end face 58.

Figure 3:
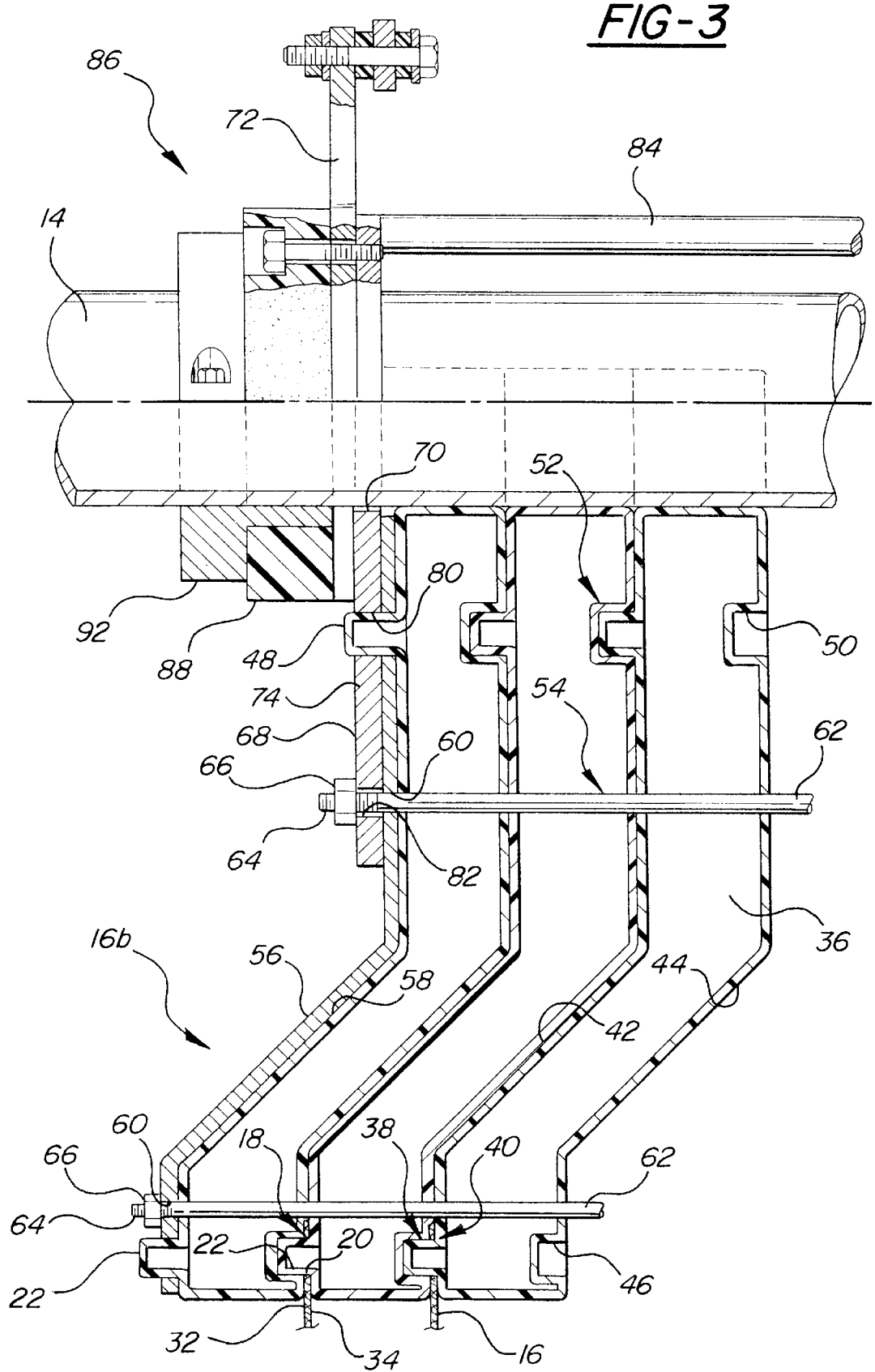
FIG. 3 is a cross-sectional detailed view of a rotatable end of the curtain-type laundering implement of FIG. 1.

At least one end plate 68 is connected between the frame member 14 and the plurality of elongate elements 16. The end plate 68 has an aperture 70 formed therethrough sheathing a portion of the frame member 14. Preferably, the end plate 68 is formed as first portion 72 separable from a second portion 74 allowing attachment of the end plate 68 to the frame member 14 by radially sliding the first and second portions, 72 and 74 into operative engagement with one another, rather than requiring longitudinal engagement of the frame member 14 through the aperture 70. The first and second portions 72 and 74 of the end plate 68, each define a portion of the aperture 70 and are operably alignable with one another to define the aperture 70 encircling the portion of the frame member 14. As best seen in FIGS. 3 and 4, the first and second portions, 72 and 74 respectively, have a plurality of apertures 76 formed therethrough and are coaxially alignable with one another for interconnecting the first and second portions with respect to one another with suitable fasteners 78. Additional apertures 80 may be formed in the end plate 68 to receive outwardly extending protrusions 48 extending from the end most face 58 of the spacer 36. At least one compression member-receiving aperture 82 may also be formed in the end plate 68 for tying the stacked group or tier of spacers 36 with sufficient rigidity to the end plate 68. An additional tie rod or compression member 84 may be connected to the end plates 68 diametrically opposite from the stacked group of spacers 36 extending along the entire longitudinal length of the group of stacked spacers 36 for maintaining the end plates in alignment with one another and assisting in maintaining the desired compressive force to urge the spacers 36 toward one another.

Bearing means 86 is provided for rotatably mounting the end plate 68 with respect to the cross beam 14. The bearing means 86 is disposed between the end plate 68 and the cross beam 14. Preferably, the bearing means 86 includes a plastic bearing member 88 affixed to the end plate 68 for movement therewith and having an outer bearing race 90 with a diameter less than the corresponding dimension of aperture 70 formed in end plate 68. The bearing member 88 is connected to the end plate portion 72 by suitable means, such as with fasteners 78 to threadably interconnect the bearing member 88 with the first and second portions, 72 and 74, defining the end plate 68. The bearing means 86 also includes a split ring inner bearing member 92, preferably formed of wear resistant material such as aluminum or steel. The split ring inner bearing member 92 is releasably affixed to the cross beam 14 and receives in overlying relation therewith the plastic outer bearing member 88 on an inner bearing race 94 for rotation of the end plate 68 and group of interconnected, stacked spacers 36 with respect to the longitudinal axis of the cross beam 14. The split ring inner bearing member 92 is formed as first and second diametrically split parts engageable with one another by radial movement with respect to the longitudinal axis of the beam 14 and releasably connectable to one another for clamping engagement with the beam 14 by suitable fasteners 100, such as threaded bolts or the like. Bearing member 92 has both radial and circumferential surface portions as best shown in FIG. 3 and, therefore, serves both rotary and thrust bearing functions. Preferably, an end plate 68 and associated bearing means 86 are provided at each end of a group or tier of stacked spacers 36.

Referring now to FIGS. 1, 2 and 5–6, the cross beam 14 extends transversely with respect to a path of travel for a vehicle to be cleaned. Two banks of curtains, each comprising a plurality of elongate, replaceable cloth elements 16 are rotatably mounted to the cross beam 14 such that the curtain elements 16 extend downwardly into the path of travel for the vehicle to be cleaned. Each element 16 has a sheet-like fabric body engageable with an external surface of the vehicle. Means 102 are provided for oscillating the plurality of elongate elements 16 within the path of travel for the vehicle to be cleaned. The oscillating means 102 includes a motor 12 generally disposed near the midpoint of the cross beam 14 on parallel arms 120 which are welded to the beam 14 in minimally cantilevered fashion. Crank arm means 106 is connected between the motor 12 and the cloth elements 16 for shifting the cloth elements 16 along a fixed path between first and second end limits of movement. A gear box 108 may be provided between the motor 12 and the crank arm means 106 to provide the desired oscillating, unsynchronized movement. By "unsynchronized movement", it is meant that the movement of two groups of stacked spacers 36 are oscillated out of phase with respect to one another. Preferably, first and second groups, 110 and 112 respectively, of stacked spacers 36 are oscillated so that oscillation of the first group 110 of stacked spacers 36 is out of synch by approximately 90° with oscillation of the second group 112 of stacked spacers 36. Each spacer 36 stacked in a particular group, oscillate in unison with the other adjacent stacked spacers 36 of the same group. Preferably, the first and second groups, 110 and 112 respectively, of stacked spacers 36 oscillate in movement about a common axis of rotation. The common axis of rotation can correspond to a longitudinal axis of the elongate cross beam 14. Preferably, the crank arm means 106 is connected to the cloth elements 16 by pivotally attaching at least one elongated link member 114 pivotally to a crank arm 116 at one end, and pivotally connecting an opposite end of the link member 114 to a radially outwardly extending portion of an enlarged end plate 118 disposed adjacent to the motor 12.

The laundering implement 10 according to the present invention includes a plurality of parallel, adjacently arranged spacers 36 movably supporting cloth elements 16 with respect to the cross member 14 for movement relative to an external surface of a vehicle. Each spacer 36 preferably has at least one face 42 in adjacent mating relationship with an opposing face 44 of an adjacent spacer 36. The plurality of cloth elements 16 are disposed sandwiched between mating faces, 42 and 44 respectively, of adjacent spacers 36 and extend outwardly beyond the spacers 36 for translation in flat or angled orientation with the spacers 36 as a single unit. Anchor pins 22 preferably are secured in essentially permanent relationship with one spacer 36 and extend into removable relationship with an adjacent spacer 36. Preferably, at least one cleaning element 16 is interposed between adjacent stacked spacers 36 for movement in concert therewith. The cleaning elements 16 preferably are formed as a continuous body of unstitched, unfolded material having a surface contact edge extending beyond the spacers 36, and each body having at least one mounting aperture 20 formed in a portion thereof lying between adjacent spacers 36. An anchor pin 22 passes through the aperture 20 in the body of the cleaning element 16 so that each clearing element 16 is anchored by one or more anchor pins 22 with respect to the spacers 36.

The laundering implement 10 according to the present invention is assembled and reconstructed according to a method comprising the steps of interposing at least a portion of one of the cleaning elements 16 between adjacent spacers 36, anchoring the interposed portion of the cleaning element 16 on an anchoring pin 22 extending between the adjacent spacers 36, and compressively sandwiching the cleaning element 16 between the adjacent spacers 36.

The present invention also encompasses a method for assembling and reconstructing a laundering implement 10 for use in cleaning an external surface of a vehicle comprising the steps of interposing at least a portion of a cleaning element 16 between adjacent spacers 36, anchoring the interposed portion of the cleaning element 16 on an anchoring pin 22 extending between the adjacent spacers 36, and compressively sandwiching the cleaning element 16 between adjacent spacers 36.

While applicants prefer the use of the simple, arch-like support structure 14 in combination with the spacers 36, it is to be understood that more conventional racks may be suspended for oscillation from the beam 14 to gain the advantages of cleaner, less "busy" appearance and reduced construction complexity, but without using the spacers 36.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for assembling and reconstructing a vehicle laundering element for use in contact-washing an external surface of a vehicle comprising the steps of:

providing a plurality of spacers having complemental mating surfaces and alternating pin and socket structures between said surfaces whereby placing said surfaces in mating contact causes the pin of one spacer to enter into the socket of an adjacent spacer;

providing a plurality of strip-like cloth laundering elements having a mounting end and a vehicle contacting end and holes formed therein adjacent said mounting end;

interposing the mounting ends of said elements between said spacers such that the holes in the elements line up with the pins and sockets of the spacers; and compressing said spacers toward one another to mate said complemental surfaces and form a unitary assembly.

2. The method of claim 1 further comprising the steps of suspending said unitary assembly on a cross beam for rotation relative thereto; and driving said unitary assembly in an oscillatory manner.

* * * * *